United States Patent
Arseneau

(10) Patent No.: US 7,247,862 B2
(45) Date of Patent: Jul. 24, 2007

(54) AFTERGLOW DETECTION AND COUNT RATE GENERATION IN A NUCLEAR IMAGING SYSTEM

(75) Inventor: Roger E. Arseneau, Buffalo Grove, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 82 days.

(21) Appl. No.: 11/165,983

(22) Filed: Jun. 24, 2005

(65) Prior Publication Data

US 2006/0289780 A1    Dec. 28, 2006

(51) Int. Cl.
    *G01J 1/42* (2006.01)
(52) U.S. Cl. .................................... 250/395
(58) Field of Classification Search .............. 250/395
    See application file for complete search history.

(56) References Cited

U.S. PATENT DOCUMENTS

| | | | | |
|---|---|---|---|---|
| 5,430,406 A | * | 7/1995 | Kolodziejczyk | 327/336 |
| 5,847,395 A | * | 12/1998 | Malmin et al. | 250/363.07 |
| 2003/0033097 A1 | * | 2/2003 | Tanaka et al. | 702/60 |

* cited by examiner

*Primary Examiner*—David Porta
*Assistant Examiner*—Marcus Taningco

(57) ABSTRACT

The afterglow and count rate/dead time of a nuclear imaging detector are calculated for use in correcting event detection and energy integration circuits. Energy value signals and event triggering signals are respectively integrated as a function of the decay setting of the detector, until they reach stable values, which are respectively used as afterglow and count rate/dead time signals used by a data processor of the detector.

20 Claims, 3 Drawing Sheets

AFTER GLOW COUNT AND COUNT RATE GENERATOR

US 7,247,862 B2

AFTERGLOW DETECTION AND COUNT RATE GENERATION IN A NUCLEAR IMAGING SYSTEM

BACKGROUND OF THE INVENTION

1. Field of the Invention

The present invention generally relates to nuclear medicine, and systems for obtaining nuclear medicine images of a patient's body organs of interest. In particular, the present invention relates to a novel procedure and system for accurately detecting the occurrence of valid scintillation events.

2. Description of the Background Art

Nuclear medicine is a unique medical specialty wherein radiation is used to acquire images that show the function and anatomy of organs, bones or tissues of the body. Radiopharmaceuticals are introduced into the body, either by injection or ingestion, and are attracted to specific organs, bones or tissues of interest. Such radiopharmaceuticals produce gamma photon emissions that emanate from the body. One or more detectors are used to detect the emitted gamma photons, and the information collected from the detector(s) is processed to calculate the position of origin of the emitted photon from the source (i.e., the body organ or tissue under study). The accumulation of a large number of emitted gamma positions allows an image of the organ or tissue under study to be displayed.

Emitted gamma photons are typically detected by placing a scintillator over the region of interest. Such scintillators are conventionally made of crystalline material such as NaI(TI), which interacts with absorbed gamma photons to produce flashes of visible light. The light photons emitted from the scintillator crystal are in turn detected by photosensor devices that are optically coupled to the scintillator crystal, such as photomultiplier tubes. The photosensor devices convert the received light photons into electrical pulses whose magnitude corresponds to the amount of light photons impinging on the photosensitive area of the photosensor device.

Not all gamma interactions in a scintillator crystal can be used to construct an image of the target object. Some of the interactions may be caused by gamma photons that were scattered or changed in direction of travel from their original trajectory. Thus, one conventional method that has been used to test the validity of a scintillation event is to compare the total energy of the scintillation event against an energy "window" or range of expected energies for valid (i.e., unscattered) events. In order to obtain the total energy of the event, light pulse detection voltage signals generated from each photosensor device as a result of a single gamma interaction must be accurately integrated from the start of each pulse, and then added together to form an energy signal associated with a particular event. Energy signals falling within the predetermined energy window are considered to correspond to valid events, while energy signals falling outside of the energy window are considered to correspond to scattered, or invalid, events, and the associated event is consequently not used in the construction of the radiation image, but is discarded. Without accurate detection of the start of an event, the total energy value may not be accurate, which would cause the signal to fall outside of the energy window and thereby undesirably discard a useful valid event.

Another instance of inaccurate information may arise when two gamma photons interact with the scintillation crystal within a time interval that is shorter than the time resolution of the system (in other words the amount of time required for a light event to decay sufficiently such that the system can process a subsequent light event as an independent event). The finite time resolution of the system arises because the response of scintillation crystals is not strictly linear, especially when there are large changes (e.g., a factor of approximately 100 or greater) in the intensity of radiation incident on the crystal. If the crystal has been operating under a high "count rate" or level of incident radiation (e.g. $10^6$ photons/sec for a gamma ray source), and this incident radiation is suddenly reduced to a lower count rate (e.g. $10^4$ photons/sec for a gamma ray source), the light output of the crystal does not immediately fall off. Instead, there is a slow decay in the light output of the crystal due to residual phosphorescence (so-called "afterglow"), so that accurate measurements cannot be made until the crystal "afterglow" has disappeared. Because of this effect, light events from the two gamma interactions are said to "pile up," or be superposed on each other. The signal resulting from a pulse pile-up would be meaningless, as it would not be possible to know whether the pulse resulted from two valid events, two invalid events, or one valid event and one invalid event.

Different solutions to the pulse pile-up problem are known in the prior art. One such solution involves the use of pile-up rejection circuitry, which either precludes the detector from processing any new pulses before processing has been completed on a prior pulse, or stops all processing when a pile-up condition has been identified. This technique addresses the problem of post-pulse pile-up, wherein a subsequent pulse occurs before processing of a pulse of interest is completed. Such rejection circuitry, however, may undesirably increase the "deadtime" of the imaging system, during which valid gamma events are being received but are not able to be processed, thereby undesirably increasing the amount of time needed to complete an imaging procedure. The "deadtime" of a system also may be a function of the speed limitations of the signal processing circuitry.

Another known technique addresses the problem of pre-pulse pile-up, wherein a pulse of interest is overlapped by the "afterglow" (e.g. the trailing edge or tail) of a preceding pulse. This technique uses an approximation of the preceding pulse tail to correct the subsequent pulse of interest. Such approximation is less than optimal because it is not accurate over the entire possible range of pile-up conditions. Further, it requires knowledge as to the precise time of occurrence of the preceding pulse, which is difficult to obtain using analog signals. Additionally, this technique consumes a large amount of computational capacity.

Yet another problem encountered in the conventional detection and processing of valid light events is the effect of signal noise on accurate event location processing. In particular, direct current (DC) drifts or other sources of noise may alter the signals from the photosensor devices significantly enough to cause the calculation of the spatial location of an event to be unacceptably inaccurate.

A known prior art solution to this problem is disclosed in commonly assigned U.S. Pat. No. 5,847,395, incorporated by reference herein in its entirety. The '395 patent discloses the use of a flash analog-to-digital converter (FADC) associated with each photosensor device (e.g., photomultiplier tube (PMT)) and a data processor that integrates the FADC output signals, generates a fraction of a running sum of output signals, and subtracts the fraction from the integrated output signals to generate an adjustment signal to correct the output signals for baseline drifts. However, this solution does not address the pile-up problem as it is concerned with energy-independent locational computation.

Therefore, there exists a need in the art for a solution that addresses the problem of pulse pile-up.

SUMMARY OF THE INVENTION

The present invention solves the existing need according to a first aspect by providing a method of determining the afterglow (count rate) of a gamma interaction in a nuclear imaging detector, including the steps of obtaining a sample of an energy signal (event start signal) from the nuclear imaging detector; integrating the sample (signal) over a predetermined amount of time to obtain an integrated sample (signal); adding the integrated sample (signal) to a predetermined portion of a prior stored sample (signal) value to obtain a current stored sample (signal) value; repeating the obtaining and integrating steps until the current stored sample (signal) value has reached a stable value; and outputting the stable sample (signal) value as an afterglow (count rate) signal.

According to another aspect of the invention, a computer program product is provided, including a computer-readable storage medium containing computer-executable instructions stored thereon, including computer-executable instructions for obtaining an event start signal from a nuclear imaging detector; integrating the event start signal over a predetermined amount of time to obtain an integrated event start signal; adding the integrated event start signal to a predetermined portion of a prior stored event start signal value to obtain a current stored event start signal value; repeating execution of the first four instructions until the current stored event start signal value has reached a stable value; and outputting the stable value as a count rate signal.

According to yet another aspect of the invention, a circuit is provided for performing the method steps as outlined above.

BRIEF DESCRIPTION OF THE DRAWINGS

The invention will become more clearly understood from the following detailed description in connection with the accompanying drawings, in which.

DETAILED DESCRIPTION OF THE PREFERRED EMBODIMENTS

Figure 1:
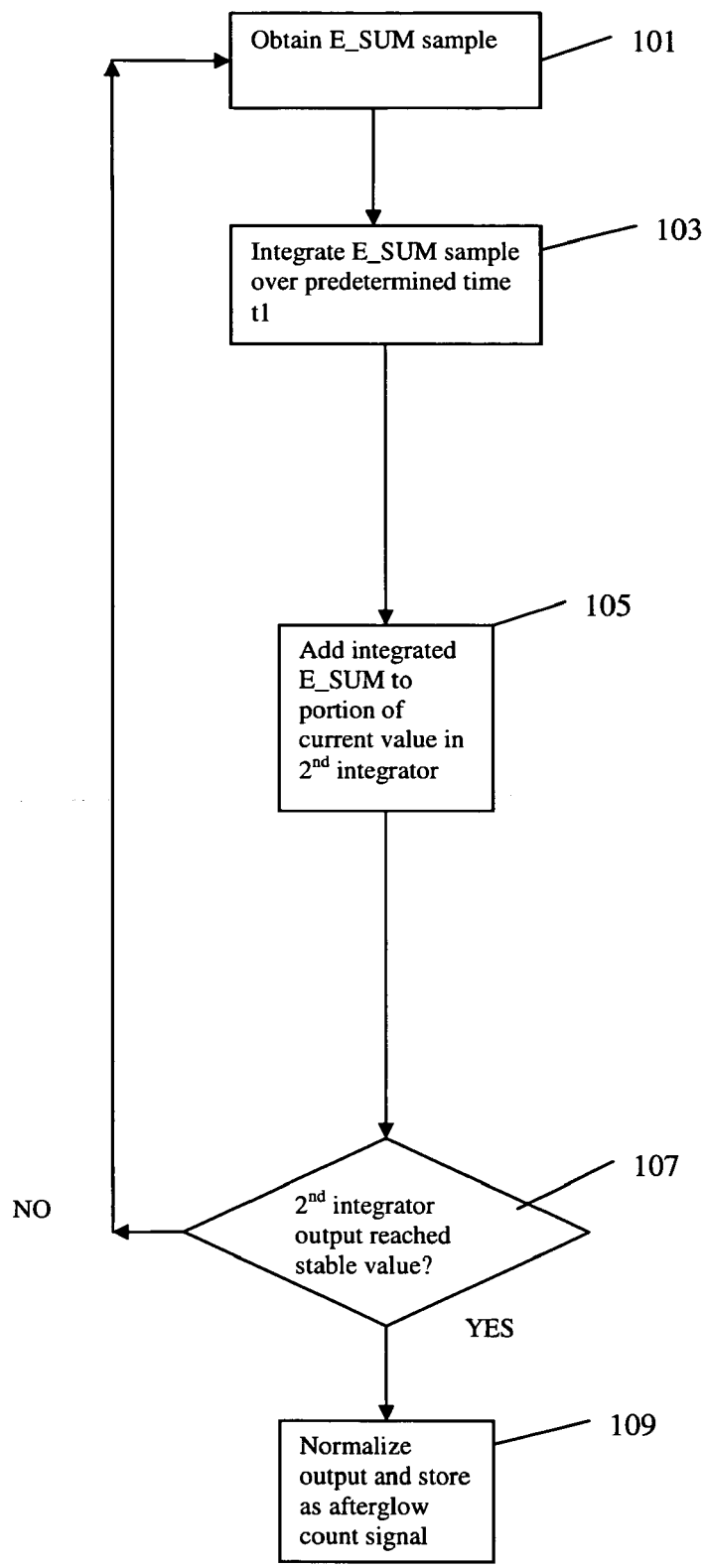
FIG. 1 is a flow chart diagram of a method of after glow count detection according to one preferred embodiment of the invention.

Referring to FIG. 1, according to one preferred embodiment of the invention, a method for obtaining the afterglow duration or "count" of a light event is disclosed. The afterglow count is indicative of a certain amount of time needed to elapse for event afterglow to sufficiently dissipate before a new gamma interaction event may be measured by the gamma camera. The method involves the use of a digital energy signal E_SUM (which is primarily used to detect a valid light event in a scintillator) to generate an afterglow signal. Such digital energy signal E_SUM is readily obtainable by connecting all of the outputs of the photosensor devices of the system to a summing amplifier, and feeding the output of the summing amplifier to a FADC as disclosed in the aforementioned '395 patent. Accordingly, no further description of the E_SUM signal will be made, other than to note that in accordance with a preferred embodiment of the invention, the digital E_SUM signal outputted from the FADC is a 10-bit signal sampled at a rate of 30 MHz.

Figure 2:
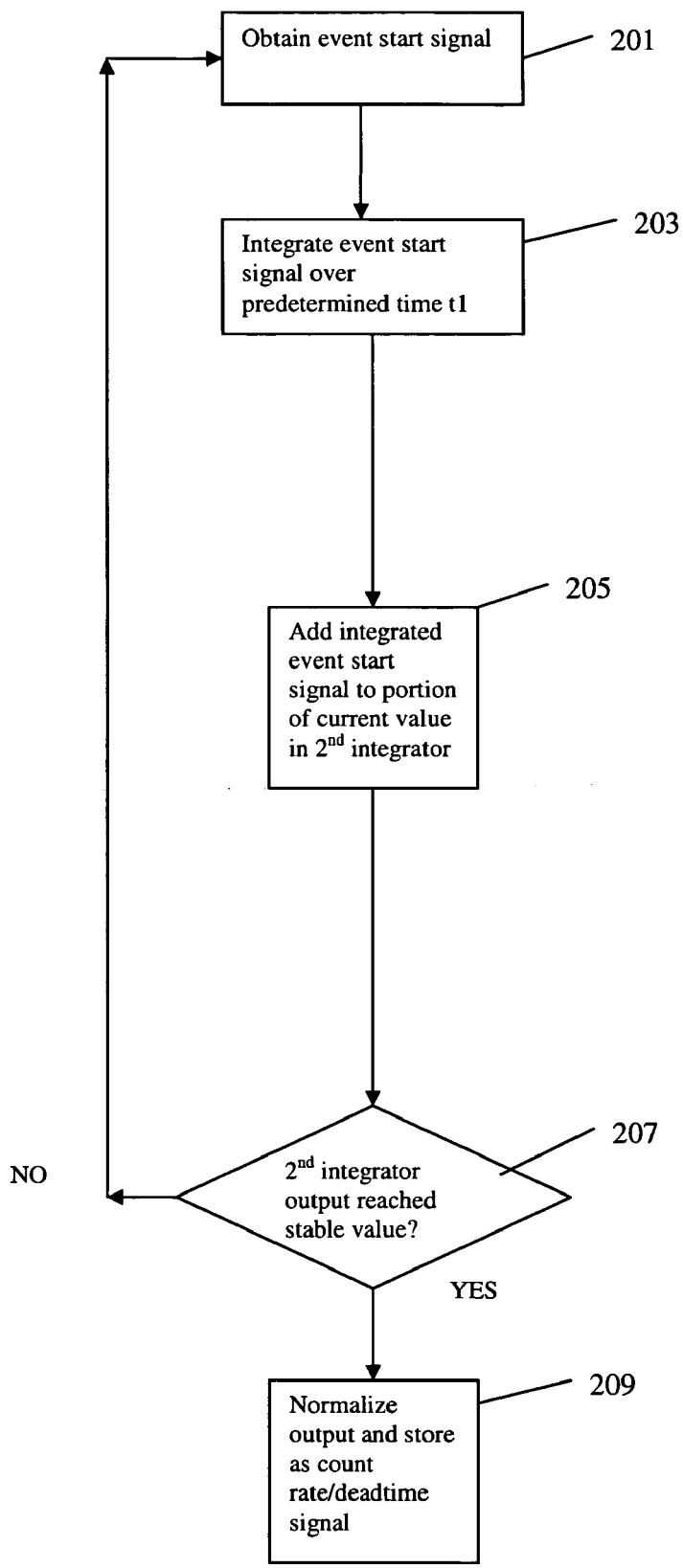
FIG. 2 is a flow chart diagram of a method of count rate detection according to a second preferred embodiment of the invention.
Figure 3A:
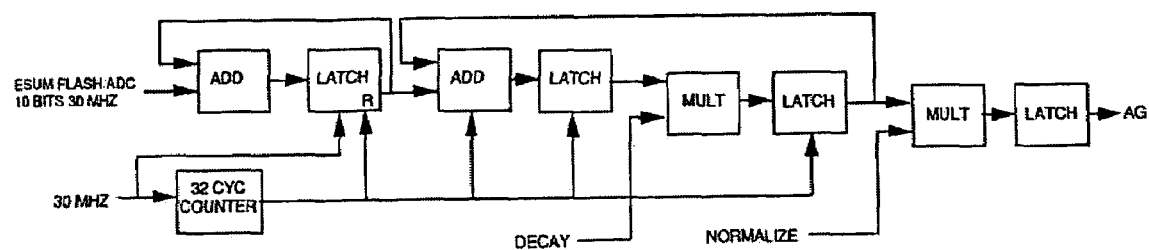
FIGS. 3A and 3B are block diagrams of examples of circuits that execute the methods according to another embodiment of the present invention.
Figure 3B:
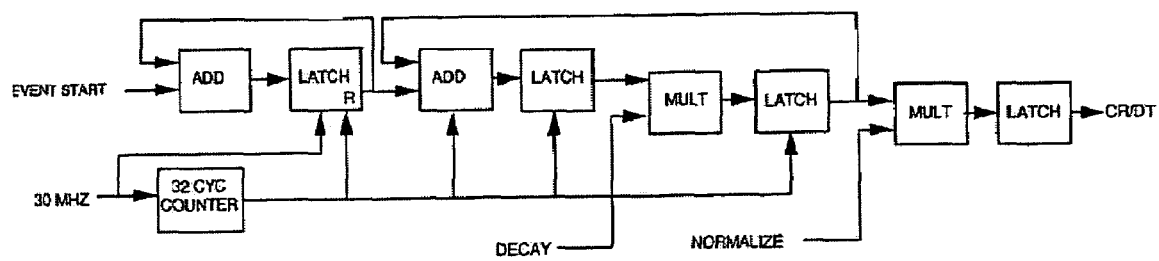

It is further noted that the method as shown in FIGS. 1 and 2 may be implemented in a number of different ways, such as by software, firmware, digital signal processing (DSP) or a hard-wired digital logic circuit as shown in FIGS. 3A and 3B, which are illustrated for purposes of explanation and exemplification only, and are not intended to restrict the scope of the present invention.

As shown in FIG. 1, at step 101, a sample of the instantaneous E_SUM signal is obtained. The sample E_SUM according to the implementation embodiment shown in FIG. 3A may be the instantaneous output of the FADC, or alternatively may be the sum of a plurality of successive output values of the FADC, which may be further processed by averaging, filtering or the like.

At step 103, E_SUM is integrated for a certain predetermined period of time t1. t1 may be determined as a function of various of the operational parameters of the particular gamma camera system.

At step 105, the integrated E_SUM is inputted to a second integrator, is added to a portion of the current stored value in the second integrator, and the new value is then stored in the second integrator.

The process of steps 101-105 is repeated until the output of the second integrator builds to a stable value, which is a function of the input value and the decay setting of the system, as determined at step 107.

Then, at step 109 the output of the second integrator is multiplied by a normalization factor in order to normalize the output and allow its slope to be adjusted. The normalized signal is then stored as an afterglow count signal, for use by the data processor of the gamma camera system to modify event processing accordingly.

Referring to FIG. 2, according to another preferred embodiment of the invention, a method for obtaining the input count rate/dead time of the system is disclosed. At step 201, an "event start" signal is obtained. The "event start" signal according to the implementation embodiment shown in FIG. 3B may be any appropriately obtained signal that indicates the beginning of a valid event, such as a signal outputted by an energy calculation circuit upon determination that the measured energy of a light event is within the established energy window, or a signal developed from a mathematical algorithm performed on the output of the E_SUM signal from the flash ADC.

At step 203, the event start signal is integrated for a certain predetermined period of time t1. t1 may be determined as a function of various of the operational parameters of the particular gamma camera system.

At step 205, the integrated event start signal is inputted to a second integrator, is added to a portion of the current stored value in the second integrator, and the new value is then stored in the second integrator.

The process of steps 201-205 is repeated until the output of the second integrator builds to a stable value, which is a function of the input value and the decay setting of the system, as determined at step 207.

Then, at step 209 the output of the second integrator is multiplied by a normalization factor in order to normalize the output and allow its slope to be adjusted. The normalized signal is then stored as a count rate/deadtime signal, for use by the data processor of the gamma camera system to modify event processing accordingly.

FIGS. 3A and 3B are general block diagrams of logic circuits according to one preferred implementation of the method according to the invention. As shown, the circuits are constructed of a logical connection of adders, latch circuits, and multipliers, which receive the input signals E_SUM and Event Start as well as decay settings and normalization values from the system. It is noted that the circuit of FIG. 3B is essentially the same as the circuit of FIG. 3A, except that the input is a fixed value Event Start signal instead of an E_SUM signal which corresponds to an instantaneous energy value of a light event.

The invention having been described, it will be apparent to those skilled in the art that the same may be varied in many ways without departing from the spirit and scope of the invention. In particular, while the invention has been described with reference to photomultiplier tube photosensor devices, the inventive concept does not depend upon the use of PMTs and any acceptable photosensor device may be used in place of a PMT. Further, any suitable gamma detector may be used in place of a scintillation crystal. Finally, the circuits of FIGS. 3A and 3B are but one example of an implementation of the invention. As previously explained the digital event detection may be performed by a programmable computer loaded with a software program, firmware, ASIC chip, DSP chip or hardwired digital circuit. Any and all such modifications are intended to be included within the scope of the following claims.

What is claimed is:

1. A method of determining an afterglow value of a gamma interaction in a nuclear imaging detector, comprising the steps of:
   (a) obtaining a sample of an energy signal from said nuclear imaging detector;
   (b) integrating said sample over a predetermined amount of time to obtain an integrated sample;
   (c) adding said integrated sample to a predetermined portion of a prior stored sample value to obtain a current stored sample value;
   (d) repeating steps (a)-(d) until said current stored sample value has reached a stable value; and
   outputting said stable value as an afterglow signal.

2. The method of claim 1, further comprising the step of normalizing said stable value prior to outputting it as said afterglow signal.

3. The method of claim 1, wherein said sample is a digital value obtained from an A/D converter.

4. The method of claim 1, wherein said afterglow signal is used by a data processor to adjust image processing parameters of said nuclear imaging detector.

5. A method of determining a count rate value of a gamma interaction in a nuclear imaging detector, comprising the steps of:
   (a) obtaining an event start signal from said nuclear imaging detector;
   (b) integrating said event start signal over a predetermined amount of time to obtain an integrated event start signal;
   (c) adding said integrated event start signal to a predetermined portion of a prior stored event start signal value to obtain a current stored event start signal value;
   (d) repeating steps (a)-(d) until said current stored event start signal value has reached a stable value; and
   outputting said stable value as a count rate signal.

6. The method of claim 5, further comprising the step of normalizing said stable value prior to outputting it as said count rate signal.

7. The method of claim 5, wherein said event start signal is a digital value obtained from an energy detection circuit.

8. The method of claim 5, wherein said count rate signal is used by a data processor to adjust image processing parameters of said nuclear imaging detector.

9. A computer program product comprising a computer-readable storage medium containing computer-executable instructions stored thereon, including computer-executable instructions for:
   (a) obtaining a sample of an energy signal from a nuclear imaging detector;
   (b) integrating said sample over a predetermined amount of time to obtain an integrated sample;
   (c) adding said integrated sample to a predetermined portion of a prior stored sample value to obtain a current stored sample value;
   (d) repeating steps (a)-(d) until said current stored sample value has reached a stable value; and
   outputting said stable value as an afterglow signal.

10. The computer program product of claim 9, wherein said storage medium further comprises computer-executable instructions for normalizing said stable value prior to outputting it as said afterglow signal.

11. A computer program product comprising a computer-readable storage medium containing computer-executable instructions stored thereon, including computer-executable instructions for:
   (a) obtaining an event start signal from a nuclear imaging detector;
   (b) integrating said event start signal over a predetermined amount of time to obtain an integrated event start signal;
   (c) adding said integrated event start signal to a predetermined portion of a prior stored event start signal value to obtain a current stored event start signal value;
   (d) repeating steps (a)-(d) until said current stored event start signal value has reached a stable value; and
   outputting said stable value as a count rate signal.

12. The computer program product of claim 9, wherein said storage medium further comprises computer-executable instructions for normalizing said stable value prior to outputting it as said count rate signal.

13. A circuit for determining an afterglow value of a gamma interaction in a nuclear imaging detector, comprising:
   means for obtaining a sample of an energy signal from said nuclear imaging detector;
   means for integrating said sample over a predetermined amount of time to obtain an integrated sample;
   means for adding said integrated sample to a predetermined portion of a prior stored sample value to obtain a current stored sample value; and
   means for outputting said stable value as an afterglow signal when said current stored sample value has reached a stable value.

14. The circuit of claim 13, further comprising means for normalizing said stable value prior to outputting it as said afterglow signal.

15. The circuit of claim 13, wherein said sample is a digital value obtained from an A/D converter.

16. The circuit of claim 13, wherein said afterglow signal is used by a data processor to adjust image processing parameters of said nuclear imaging detector.

17. A circuit for determining a count rate value of a gamma interaction in a nuclear imaging detector, comprising:

means for obtaining an event start signal from said nuclear imaging detector;

means for integrating said event start signal over a predetermined amount of time to obtain an integrated event start signal;

means for adding said integrated event start signal to a predetermined portion of a prior stored event start signal value to obtain a current stored event start signal value; and means for outputting said stable value as a count rate signal when said current stored event start signal value has reached a stable value.

18. The circuit of claim 17, further comprising means for normalizing said stable value prior to outputting it as said count rate signal.

19. The circuit of claim 17, wherein said event start signal is a digital value obtained from an energy detection circuit.

20. The circuit of claim 17, wherein said count rate signal is used by a data processor to adjust image processing parameters of said nuclear imaging detector.

* * * * *